United States Patent Office 2,868,824
Patented Jan. 13, 1959

2,868,824

POLYMERIC ORGANOSILOXANES

Loren A. Haluska, Midland, Mich., assignor to Dow Corning Corporation, Midland, Mich., a corporation of Michigan No Drawing. Application August 9, 1956
Serial No. 603,174

4 Claims. (Cl. 260—448.2)

This invention relates to organosiloxanes in which some of the silicon atoms are connected by organic ether groups.

It is the object of this invention to provide novel compositions of matter which are useful as cosmetic additives, lubricants for organic fibers and as surface active agents. Other objects and advantages will be apparent from the following description.

This invention relates to organosiloxanes of the unit formula

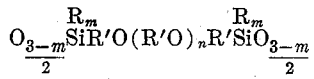

in which R is a saturated hydrocarbon or aromatic hydrocarbon radical or a halogenated saturated hydrocarbon or halogenated aromatic hydrocarbon radical, R' is an alkylene radical of at least 2 carbon atoms, $m$ has an average value from 0 to 2 inclusive, and $n$ has a value of at least 1.

The polymeric materials of this invention can be prepared by reacting a dialkenyl ether of a glycol or a polyglycol with a silane of the formula $R_mSiHCl_{3-m}$ in the presence of a catalyst such as chloroplatinic acid or platinum on charcoal. This reaction is best carried out by heating a mixture of the reactants and the catalyst at a temperature from 50 to 150° C. whereby addition of the SiH compound to the double bond of the alkenyl group of the ether takes place. The resulting chlorosilanes can then be hydrolyzed in the conventional manner to give the siloxanes of this invention.

Alternatively the compositions can be prepared by reacting a siloxane containing a hydrogen atom bonded to each Si atom. In all cases the number of SiH groups should be at least equal to the number of alkenyl groups in the glycol ethers. It should be understood that a mixture of two or more SiH compounds and/or two or more glycol ethers can be employed in the reaction.

For the purpose of this invention R can be any saturated aliphatic hydrocarbon radical such as alkyl radicals such as methyl, ethyl, butyl, isobutyl, hexyl, or octadecyl; any saturated cycloaliphatic hydrocarbon radical such as cyclohexyl and cyclopentyl; any aromatic hydrcarbon radical such as phenyl, xenyl, naphthyl and tolyl and any aralkyl hydrocarbon radical such as benzyl and β-phenylethyl; any halogenated saturated hydrocarbon radical such as chlorotrifluorocyclobutyl, trifluoropropyl, dichlorocyclohexyl, monochlorocyclopentyl and tetrafluoroethyl and any halogenated aromatic hydrocarbon radical such as chlorophenyl, bromoxenyl, and α,α,α-trifluorotolyl.

It should be understood that the various R groups on each silicon atom can be the same or different and the various R groups on the two silicon atoms in the siloxane units can be the same or different.

For the purpose of this invention R' can be any alkylene radical of at least 2 carbon atoms such as ethylene, propylene, hexylene or octadecylene. These alkylene radicals can have either straight chains or branch chains. It should be understood that the various R' radicals within any given polymer unit can be the same or different.

This invention also relates to copolymers of from .1 to 99.9 mol percent siloxane units of the formula

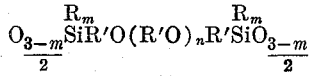

in which R, R', $m$ and $n$ are as above defined and from .1 to 99.9 mol percent siloxane units of the formula

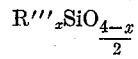

in which R''' is a monovalent hydrocarbon radical or a halogenated monovalent hydrocarbon radical, and $x$ has an average value from 0 to 3 inclusive.

These copolymers can be prepared by the cohydrolysis of the corresponding chlorosilanes. This cohydrolysis can be carried out in the conventional manner for cohydrolyzing chlorosilanes. Alternatively the copolymers can be prepared by catalytic interaction of the corresponding siloxanes. For example, a siloxane of the formula

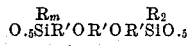

can be interacted with a cyclic siloxane of the formula $(R'''_2SiO)_4$ in the presence of potassium hydroxide.

A third method for preparing the copolymers of this invention is that of interacting the dialkenyl ethers of the glycol or polyglycols with a copolymeric siloxane in which some of the silicon atoms contain silicon bonded hydrogen atoms. This reaction is best carried out by heating a mixture of the reactants at from 50 to 150° C. in the presence of a platinum catalyst.

Silanes of the formula $R_mSiHCl_{3-m}$ in which R is a halogenated hydrocarbon radical are best prepared by reacting the corresponding Grignard reagent with trichlorosilane.

The following examples are illustrative only and should not be construed as limiting the invention which is properly delineated in the appended claims.

*Example 1*

A mixture of 159.2 g. of the divinyl ether of diethylene glycol, 441.8 g. of PhMe₂SiOSiHMe₂, 3 g. of a .35% solution of chloroplatinic acid in dimethyl carbitol and 200 ml. of toluene was heated at a temperature of from 137 to 138° C. for 18 hours. The reaction product was heated to remove the solvent and excess disiloxane. The distillation residue amounted to 554.9 g. of a fluid having the formula

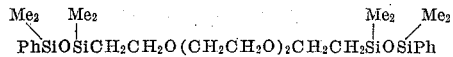

having a viscosity at 25° C. of 14.85 cs. and a refractive index at 25° C. of 1.4833.

*Example 2*

169.3 g. of tetramethyldisiloxane were added over a period of 4 hours and 47 minutes to a solution of 199.6 g. of the divinyl ether of diethylene glycol, 3 g. of the catalyst of Example 1 and 200 ml. of toluene. During addition of the siloxane the temperature ranged from 60 to 63° C. After addition was complete the mixture was heated at 120.5° C. for an additional 2 hours and 38 minutes. The product was then stripped of volatiles by heating to 198.5° C. at .5 mm. There was obtained 336.1 g. of a fluid product which was a polymeric siloxane of the unit formula

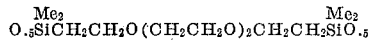

This siloxane had a viscosity at 25° C. of 620 cs. and a refractive index at 25° C. of 1.4550.

Example 3

When the following dialkenyl glycol ethers are reacted in the proportions shown with the following silanes in the manner of Example 2 and the addition products are hydrolyzed in the conventional manner, siloxanes having the following unit formulae are obtained:

| Mols Ether | Ether | Silane | Mols Silane | Siloxane unit formula |
|---|---|---|---|---|
| 1 | $CH_2=CHCH_2O(CH_2)_{18}OCH_2CH=CH_2$ | $HSiCl_3$ | 2 | $O_{3/2}Si(CH_2)_3O(CH_2)_{18}O(CH_2)_3SiO_{3/2}$ |
| 1 | $CH_2=CH(CH_2)_{10}(OCH_2CH_2)_{10}OCH=CH_2$ | $PhSiHCl_2$ | 2 | $\overset{Ph}{O}Si(CH_2)_{18}(OCH_2CH_2)_{10}O(CH_2)_2\overset{Ph}{Si}O$ |
| 1 | $\overset{Me}{CH_2=CH(CH_2)_4OCHCH_2OCH=CH_2}$ | $C_{18}H_{37}SiHCl_2$ <br> $C_6H_{11}SiHCl_2$ | 1 <br> 1 | $\overset{C_{18}H_{37}}{O}Si(CH_2)_6O\overset{Me}{CH}CH_2O(CH_2)_2\overset{C_6H_{11}}{Si}O$ |
| 1 | $CH_2=CHOCH_2CH_2OCH=CH_2$ | $C_6H_5C_6H_4SiHCl_2$ | 2 | $\overset{C_6H_4C_6H_5}{\underset{|}{O}}Si(CH_2)_2OCH_2CH_2O(CH_2)_2\overset{C_6H_4C_6H_5}{\underset{|}{Si}}O$ |
| 1 | $CH_2=CHO(CH_2CH_2O)_{8.3}CH=CH_2$ | $CH_3C_6H_4SiHCl_2$ <br> $ClC_6H_4SiHCl_2'$ | 1 <br> 1 | $\overset{C_6H_4CH_3}{\underset{|}{O}}Si(CH_2)_2O(CH_2CH_2O)_{8.3}(CH_2)_2\overset{C_6H_4Cl}{\underset{|}{Si}}O$ |
| 1 | $CH_2=CHOCH_2CH_2OCH=CH_2$ | $CF_3CH_2CH_2SiHCl_2$ <br> $CF_3C_6H_4SiHCl_2'$ | 1 <br> 1 | $\overset{C_6H_4CF_3}{O}Si(CH_2)_2OCH_2CH_2O(CH_2)_2\overset{CH_2CH_2CF_3}{Si}O$ |

Example 4

When the corresponding chlorosilanes are cohydrolyzed in the conventional manner, the following siloxane copolymers are obtained:

(1)

25 mol percent $O\overset{Me}{Si}(CH_2)_2O(CH_2CH_2O)_2(CH_2)_2\overset{Me}{Si}O$
25 mol percent $CH_2=\overset{Me}{C}HSiO_{3/2}$
25 mol percent $CF_3CH_2CH_2\overset{Me}{Si}O$ and
25 mol percent $ClC_6H_4SiO_{3/2}$ (2)

25 mol percent $O\overset{Me}{Si}(CH_2)_2O(CH_2CH_2O)_2(CH_2)_2\overset{Me}{Si}O$
25 mol percent $C_6H_{11}SiO_{3/2}$
25 mol percent $C_6H_4CH_2\overset{Me}{Si}O$
15 mol percent $CF_3C_6H_4SiO_{3/2}$
5 mol percent $C_{18}H_{37}SiO_{3/2}$, and
5 mol percent $SiO_2$ That which is claimed is:

1. A polymeric organosiloxane having the unit formula $$O_{\frac{3-m}{2}}Si\overset{R_m}{R'}O(R'O)_n\overset{R_m}{R'}SiO_{\frac{3-m}{2}}$$

in which R is selected from the group consisting of saturated hydrocarbon radicals, aromatic hydrocarbon radicals, halogenated saturated hydrocarbon radicals and halogenated aromatic hydrocarbon radicals, R' is an alkylene radical of at least 2 carbon atoms, $m$ has an average value from 0 to 2, and $n$ has a value of at last 1.

2. A polymeric organosiloxane having the unit formula $$O_{.5}\overset{Me_2}{Si}CH_2CH_2O(CH_2CH_2O)_2CH_2CH_2\overset{Me_2}{Si}O_{.5}$$

where Me represents the methyl radical.

3. A copolymeric siloxane comprising from .1 to 99.9 mol percent siloxane units of the formula $$O_{\frac{3-m}{2}}Si\overset{R_m}{R'}O(R'O)_n\overset{R_m}{R'}SiO_{\frac{3-m}{2}}$$

in which R is selected from the group consisting of saturated monovalent hydrocarbon radicals, aromatic hydrocarbon radicals, halogenated saturated hydrocarbon radicals and halogenated aromatic hydrocarbon radicals, R' is an alkylene radical of at least 2 carbon atoms, $m$ has an average value from 0 to 2 inclusive and $n$ has a value of at least 1 and from .1 to 99.9 mol percent siloxane units of the formula $$R'''_x SiO_{\frac{4-x}{2}}$$

in which R''' is selected from the group consisting of monovalent hydrocarbon radicals and halogenated monovalent hydrocarbon radicals and $x$ has an average value from 0 to 3 inclusive.

4. A siloxane of the formula $$Ph\overset{Me_2}{Si}O\overset{Me_2}{Si}CH_2CH_2O(CH_2CH_2O)_2CH_2CH_2\overset{Me_2}{Si}O\overset{Me_2}{Si}Ph$$

where Me and Ph represent the methyl and phenyl radicals respectively.

References Cited in the file of this patent

Journal of Polymeric Science, vol. 8, No. 3, page 259. (Copy in Division 60.)

UNITED STATES PATENT OFFICE
Certificate of Correction

Patent No. 2,868,824

January 13, 1959

Loren A. Haluska

It is hereby certified that error appears in the printed specification of the above numbered patent requiring correction and that the said Letters Patent should read as corrected below.

Column 2, line 24, for that portion of the formula reading "$R_m$" read —$R_2$—.

Signed and sealed this 28th day of April 1959.

[SEAL]

Attest:
T. B. MORROW,
*Attesting Officer.*

ROBERT C. WATSON,
*Commissioner of Patents.*